May 10, 1966      E. J. STRANDINE      3,249,963
NECK CLAMP FOR POULTRY SHACKLE
Original Filed Dec. 19, 1961      2 Sheets-Sheet 1
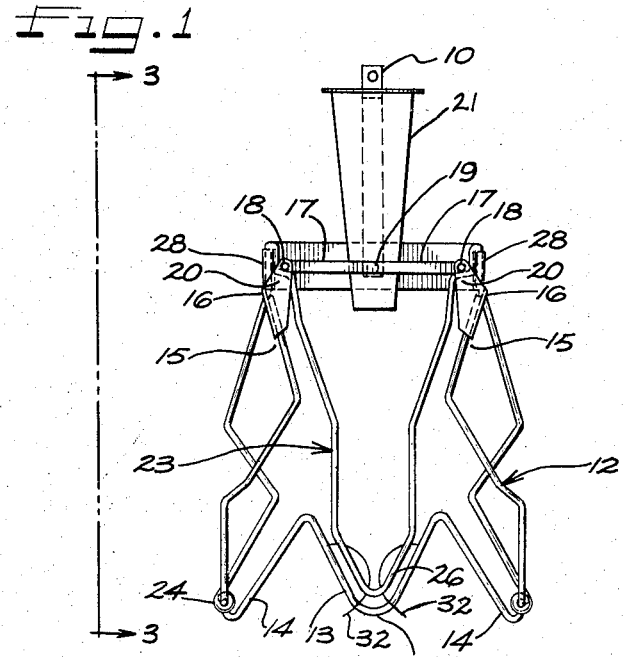
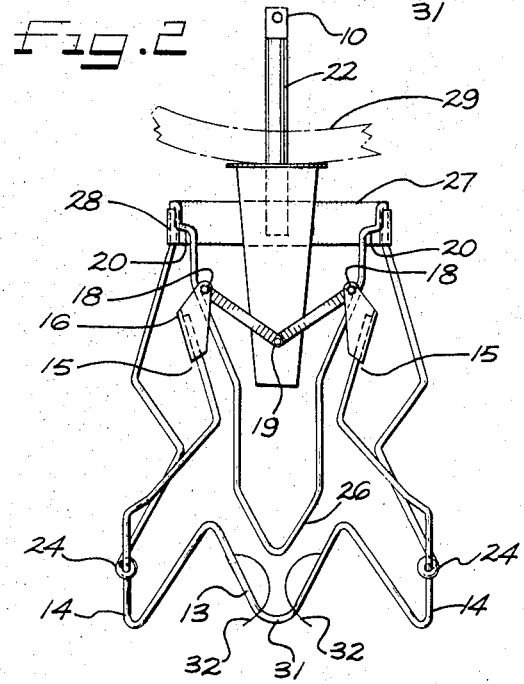
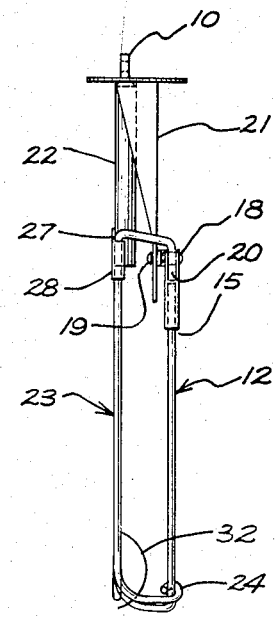
INVENTOR.
ELDON J. STRANDINE
BY
ATTORNEY.

May 10, 1966 E. J. STRANDINE 3,249,963
NECK CLAMP FOR POULTRY SHACKLE
Original Filed Dec. 19, 1961 2 Sheets-Sheet 2
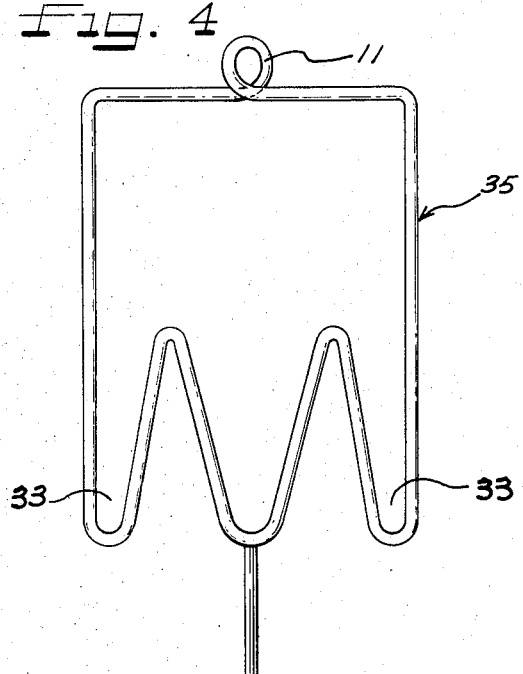
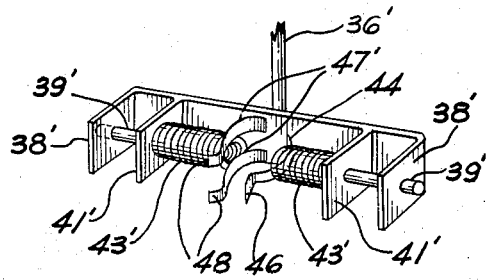
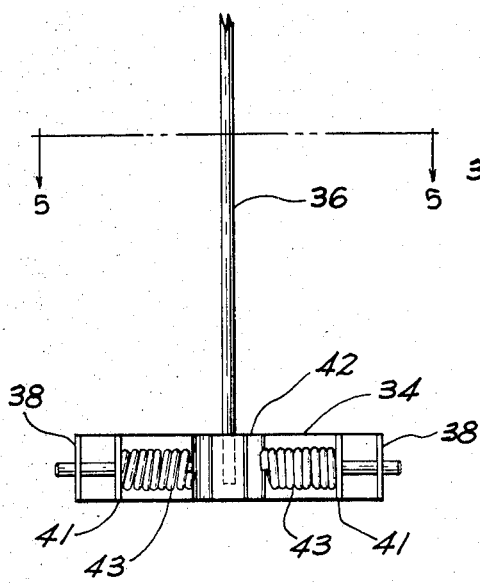
INVENTOR.
ELDON J. STRANDINE
BY
ATTORNEY.

United States Patent Office 3,249,963
Patented May 10, 1966

3,249,963
NECK CLAMP FOR POULTRY SHACKLE
Eldon J. Strandine, Chicago, Ill., assignor to Swift & Company, Chicago, Ill., a corporation of Illinois
Original application Dec. 19, 1961, Ser. No. 160,593. Divided and this application Jan. 18, 1965, Ser. No. 426,001
5 Claims. (Cl. 17—44.1)

This application is a divisional of my copending application, Ser. No. 160,593, filed December 19, 1961.

This invention relates to improved neck clamps for poultry and more particularly to neck clamps adapted for use in conjunction with poultry shackles.

In conventional dressing of poultry, the birds are suspended from shackles and then conveyed past successive stations where the birds are dispatched by severing the jugular veins, bled, and finally immersed in a scalding bath. Although the birds are insensible when scalded, variable amounts of scald water may be drawn through the trachea into the bird's lungs or air sacs. If the scald water is contaminated with bacteria or dirt, these foreign materials will be absorbed into the lungs and adjacent tissue of the bird. However if the trachea is closed or blocked before the bird is immersed in the scalding bath, scald water will be prevented from reaching the bird's lungs. Previously, it has been suggested that poultry be placed in dressing racks to facilitate the plucking of the feathers after scalding. Some dressing racks have clasps which hold the neck of the bird in place. However, due to the necessity of allowing blood to pass out of the neck, the clasps do not exert much pressure on the neck and hence do not close the trachea. Thus, when the birds on these racks are placed in the scalding bath, scald water is still drawn into the lungs and air sacs of the bird.

Heretofore, closing or blocking of the trachea has been accomplished by independent individual trachea pinching clips which are manually attached to, and subsequently manually detached from the neck of the bird. While such clips and clamps satisfactorily close off the trachea, they frequently become dislodged or lost during the processing of the bird. Further, the clips must be placed on the bird with a certain degree of accuracy to insure that the trachea is adequately closed; and they must be manually removed. In modern highly automatic conveyorized poultry plants, these manual operations create "bottlenecks" and tend to slow down the dressing procedure.

It is therefore a principal object of my invention to provide an improved apparatus for closing the trachea of poultry whereby the above described disadvantages are overcome.

It is another object of my invention to provide an improved poultry neck clamp for preventing scald water from reaching the lungs of a bird.

Another object of my invention is to provide an improved poultry shackle having incorporated therein a neck clamp for closing the trachea of the bird.

A further object of my invention is to provide an improved poultry shackle having a neck loop with a trachea clamp from which the bird can be automatically removed.

A still further object of my invention is to provide an improved poultry shackle including a neck clamp which may be automatically unloaded when the feet of the bird are disengaged from the shackle.

Additional objects and advantages will be apparent from the following description and drawings.

My invention comprises an improved poultry carcass shackles having trachea blocking means mounted thereon whereby the trachea of the dispatched bird may be sufficiently restricted to prevent scald water from being drawn or forced through the cut in the bird's neck and into the lungs or air sacs. In a shackle having supporting means for holding the neck and legs of poultry, clamping means may be connected to the support in such a manner as to cooperate with the neck support to supply sufficient pressure to close the trachea of poultry mounted in the shackle. Preferably, the clamping means is made up of spring members which press the neck against the support. If it is desired to have an automatic unloading shackle, removing means may be located adjacent the supporting means for lifting the neck of the poultry out of the supporting means and the trachea clamping means. If it is desired to have the neck of the bird hanging straight down in a vertical position, the clamping means may be attached below a frame which has means for holding the legs of the bird. The latter clamping means may be comprised of a neck holding means and bias means operatively connected to the holding means for urging the holding means to close upon a poultry neck with sufficient pressure to close the trachea.

In the drawings:

FIGURE 1 is a front elevation view of an automatic poultry shackle in closed position;

FIGURE 2 is a front elevation view of the poultry shackle of FIGURE 1 in open position;

FIGURE 3 is a side elevation view taken on line 3—3 of FIGURE 1;

FIGURE 4 is a front elevation view of a poultry shackle embodying another version of the present invention;

FIGURE 5 is a partial plan view taken at line 5—5 of FIGURE 4; and

FIGURE 6 is a partial perspective view of a modification of the clamp in FIGURES 4 and 5 with the shackle body removed.

The poultry shackles illustrated are of the type commonly used with an overhead conveyor. The shackles, which are preferably constructed of wire having a series of bends to give the desired configuration, are connected to the conveyor by means of a chain or the like (not shown) through a hole 10 in a shackle shaft or a loop 11 in the wire body of a shackle. The conveyor forms no part of this invention and has purposely been omitted from the drawings in order to permit emphasis of my improvement in shackle structure.

Referring to FIGURES 1, 2 and 3, a standard automatic poultry shackle, preferably formed substantially from wire parts similar to those taught in United States Patent No. 2,797,436, is adapted with the instant improvement. The shackle comprises a movable wire frame member generally 12 which is shaped to include a neck support loop 13 and leg loops 14 and is adapted for vertical movement to open and close the shackle. The ends 15 of the movable member 12 are fastened to brackets 16 which are secured to connecting links 17 by a revolvable pin 18. These connecting links 17 are pivotally secured through a common joint 19 to plunger 21 which is slidably mounted on shaft 22. Preferably the plunger and links are made of sheet metal; however, they could be constructed of wire or other material. The shackle also comprises a stationary member generally 23 which is shaped to contain leg grippers 24, and a neck restraining means shown here as a releasing loop 26. The leg grippers 24 are bent around the movable member just above the leg loops in such a manner that the movable member is free to slide vertically and the leg grippers will hold the poultry legs in the loops when the movable member is in the closed position. The stationary member 23 is secured by securing means 28 to connecting bar 27 which is rigidly connected to shaft 22. When the shackle is in the closed position as shown in FIGURE 1, the revolvable pins 18 rest on horizontal bends 20 of stationary member 23 thus preventing the weight of the poultry from pulling the movable member 12 to the open position. When the plunger is lowered, however, the connecting links 17 draw securing means 28 inwardly causing the revolving pins 18 to roll off of the horizontal bends 20 and the movable member 12 to be lowered. Thus the depressing of plunger 21 will lower the movable member 12 to open the shackle as shown in FIGURE 2. This may advantageously be accomplished by a cam 29 positioned along the path of the conveyor. The stationary member is stationary with respect to the remainder of the shackle but is movably connected to the overhead conveyor by means of a chain or the like through hole 10.

The neck support loop 13 is provided with a clamp generally 31, preferably consisting of two oppositely disposed curved wire springs 32 mounted on opposite sides of the neck support, one end of each spring, preferably the lower end, being free. The other ends of the springs are securely mounted on the neck support with their convex sides directed inwardly in such a manner that they will cooperate with the neck support to apply sufficient pressure to close the trachea of poultry held in the shackle.

In operation, the feet of the bird are placed through the leg loops 14 and the movable member 12 of the shackle is moved to the closed position as shown in FIGURE 1. Thus, the bird will hang with its neck downward for bleeding. When the bird is to be scalded, the neck is lifted up, dropped over the neck releasing loop 26 and pushed into the neck support loop 13, while the shackle remains in the attitude shown in FIGURE 1. As the neck is being pushed into place, the curved wire springs 32 separate to allow it to enter therebetween. After the neck is in place, the springs exert pressure on the neck to hold it tightly within loops 13 and 26. This pressure, along with the resulting pressure of the neck against the neck support loop 13, restricts the trachea of the bird sufficiently to prevent scald water from entering the air sacs of the bird. The bird, being thus mounted on the shackle, may then be immersed in the scald water without danger of contamination.

When it is desired to remove the bird from the shackle, plunger 21 is depressed, for instance by passing the shackle past cam 29, which in turn causes the connecting links 17 to lower the movable member 12. As the movable member descends, the stationary neck releasing loop 26 restrains the bird's neck and causes it to be withdrawn from the clamp 31 on the neck support loop 13. At the same time the leg loops move away from leg grippers 24 to release the legs, and the bird will fall free.

The preferred form of clamp 31, as shown in FIGURES 1 and 2, comprises "U" shaped springs, however, they may be semicircular, circular, "V" shaped or of some similar shape. Regardless of shape they should be flexible enough to easily clamp the birds' neck, yet rigid enough to hold the bird's neck in the neck support loop and to restrict the trachea. If desired, the springs may be positioned so that they will overlap one another in the neck loop. Further, it is evident that the clamp may be used on any conventional shackle having a neck support. If a shackle is used which is not of the automatic unloading type, it would only be necessary to manually lift the neck out of the support loop when it is desired to remove the neck from the clamp.

In FIGURE 4, a poultry shackle having a wire frame generally 35 formed in such a manner to include leg loops 33 is shown with a depending clamp assembly generally 34 attached thereto by means of a rod 36 at a sufficient distance to place it adjacent to the neck of a suspended bird. Usually a distance 12 to 15 inches is adequate. The shackle may be of any conventional type and may be made of materials such as sheet metal as well as wire. Looking at FIGURES 4 and 5, it can be seen that the clamp assembly 34 consists of a bracket 37 having end plates 38 mounted at each end thereof. A pair of sliding rods 39 are reciprocally mounted in end plates 38 and in support plates 41 which are secured inwardly of the bracket 37. Holding means comprising two curved clamp bands 42 are mounted in the center of the bracket on the ends of sliding rods 39. The bands are slightly separated and are disposed with concave sides facing each other. A helical compression spring 43 is mounted on each of the sliding rods 39 between the support plates 41 and the curved clamp bands 42 to bias the bands toward one another. This clamp has the advantages of being strong enough to compress the neck of a bird sufficiently to close the trachea and yet flexible enough to allow the neck to be easily inserted or removed. Further, since the clamp is connected directly to the shackle it will not become dislodged inadvertently during processing of the bird. Since the clamp may be mounted on a conventional shackle, it is not costly to install nor does it require extensive revision of processing procedures.

In use, the feet of the birds are placed in loops 33 and the neck is pushed between the bands 42. The pressure exerted by the helical springs on the clamp bands 42 is transferred to the neck of the bird and thus restricts the trachea. The device can be automatically unloaded by merely disengaging the feet from the leg loops 33 and allowing the weight of the bird to pull the neck out of the clamp assembly. Thus it may be seen that the trachea of birds mounted on the shackle may be quickly clamped merely by pushing the neck between the bands. This rapid clamping eliminates the time-consuming operation of accurately fastening individual clips on the trachea of each bird.

The clamp assembly may be modified as in FIGURE 6. In FIGURE 6 the parts corresponding to parts shown in FIGURES 4 and 5 are numbered similarly and are indicated with a prime exponent. A single clamp band 44 having a curved extension 46 is mounted on one side. Two clamp bands 47, having curved extensions 48 are mounted on the other side and are oriented to receive the single clamp band 44 therebetween. In loading the shackle, the bands may be parted by pushing the neck between the curved extensions 46 and 48. In unloading the shackle, the weight of the bird pulls the neck out of the bands. This modification has the additional advantage of allowing the clamp to make a complete ring around the bird's neck and as a result gives tighter clamping of the trachea and also allows the closing of trachea of birds having small necks.

Obviously, many modifications and variations of the invention as hereinbefore set forth may be made without departing from the spirit and scope thereof; and, therefore, only such limitations should be imposed as are indicated in the appended claims.

I claim:

1. An improved poultry shackle comprising, in combination: a frame having means for holding the legs of the poultry; connecting means connected to and extending below said frame; a bracket mounted on the lower extremity of said connecting means; clamping means mounted on said bracket; and helical springs mounted on said bracket and abutting said clamping means for applying compressive pressure to said clamping means.

2. In a shackle for holding poultry carcasses, the improvement comprising: clamping means located below the shackle and springs abutting said clamping means for applying compressive pressure to said clamping means for closing the trachea of the poultry; and means connecting said clamping means to the shackle to prevent the clamping means from becoming dislodged.

3. In a shackle for holding carcasses, the improvement comprising: a rod connected to and extending below the shackle; a bracket mounted on the lower extremity of said rod; clamping means mounted on said bracket, and helical springs mounted on said bracket and abutting said clamping means for applying compressive pressure to said clamping means.

4. The shackle of claim 3 in which the clamping means comprises two curved bands with their concave sides facing each other and being slightly separated.

5. The shackle of claim 3 in which the clamping means comprises a single band on one side and two bands on the other side with the concave side of said single band facing the concave sides of said two bands which are oriented in such a manner as to receive the single band therebetween.

References Cited by the Examiner

UNITED STATES PATENTS

| | | | |
|---|---|---|---|
| 1,796,739 | 3/1931 | Williams | 17—44.1 |
| 2,405,638 | 8/1946 | Bilek | 17—44.1 |
| 2,585,194 | 2/1952 | Wagner | 17—11.2 |

SAMUEL KOREN, *Primary Examiner.*

LUCIE H. LAUDENSLAGER, *Examiner.*